United States Patent
Diederiks

(10) Patent No.: US 7,619,366 B2
(45) Date of Patent: Nov. 17, 2009

(54) SYSTEM FOR AND METHOD OF CONTROLLING A LIGHT SOURCE AND LIGHTING ARRANGEMENT

(75) Inventor: Elmo Marcus Attila Diederiks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 540 days.

(21) Appl. No.: 10/535,294

(22) PCT Filed: Oct. 31, 2003

(86) PCT No.: PCT/IB03/04889

§ 371 (c)(1),
(2), (4) Date: May 17, 2005

(87) PCT Pub. No.: WO2004/049767

PCT Pub. Date: Jun. 10, 2004

(65) Prior Publication Data

US 2006/0071605 A1 Apr. 6, 2006

(30) Foreign Application Priority Data

Nov. 22, 2002 (EP) .................................. 02079924

(51) Int. Cl.
*H05B 37/02* (2006.01)
(52) U.S. Cl. .................. 315/149; 315/153; 250/214 AL

(58) Field of Classification Search ............. 315/209 R, 315/219, 291, 307, 294, 292, 293, 312, 360, 315/149–158; 250/221, 342, 214 R, 214 AL; 362/223, 239, 225, 802

See application file for complete search history.

(56) References Cited

U.S. PATENT DOCUMENTS

| | | | | |
|---|---|---|---|---|
| 5,406,176 A * | 4/1995 | Sugden | ....................... | 315/292 |
| 5,489,827 A * | 2/1996 | Xia | ............................ | 315/294 |
| RE37,135 E * | 4/2001 | Elwell | ........................ | 315/154 |
| 6,548,967 B1 | 4/2003 | Dowling et al. | | |
| 6,724,159 B2 * | 4/2004 | Gutta et al. | .................. | 315/292 |
| 6,960,892 B2 * | 11/2005 | Loughrey | .................... | 315/294 |
| 2002/0015097 A1 | 2/2002 | Martens et al. | ............... | 315/76 |
| 2003/0218537 A1 | 11/2003 | Hoch et al. | | |
| 2007/0115658 A1 | 5/2007 | Mueller et al. | | |

FOREIGN PATENT DOCUMENTS

| | | | |
|---|---|---|---|
| JP | 2000036392 A | 2/2000 | |
| JP | 2001060406 A | 3/2001 | |

* cited by examiner

*Primary Examiner*—Douglas W Owens
*Assistant Examiner*—Jimmy T Vu

(57) ABSTRACT

The invention relates to a system for controlling a light source (208, 210, 212) within an area (200), the system comprising: location means conceived to detect a position of at least one person within an area (200); activity means conceived to detect a kind of activity performed by the at least one person within the area; and lighting control means conceived to control the light source (208, 210, 212) within the area (200) in response to the detected at least one person and the kind of activity performed by the at least one person within the area (200).

20 Claims, 3 Drawing Sheets

SYSTEM FOR AND METHOD OF CONTROLLING A LIGHT SOURCE AND LIGHTING ARRANGEMENT

The invention relates to a system for controlling a light source within an area.

The invention further relates to a method of controlling a light source within an area.

The invention further relates to a lighting arrangement comprising such a system.

An embodiment of such a system and method is disclosed in U.S. 2002/0015097. Here, a lighting arrangement is described that comprises a sensor which is capable of measuring electromagnetic radiation, preferably visible light as well as infrared light, in a room. The lighting arrangement further comprises control means for controlling the lighting in the room in dependence upon the measured radiation. The sensor comprises a video sensor, such as a Charged Coupled Device (CCD) sensor, which is capable of producing an electronic image of the room. With this lighting arrangement switching a light source on or off is controlled automatically in dependence on the presence of people. If one or more persons are detected in for example an office, the light source is switched on as long as the person is present within the office. Further, clock information can be used to, depending upon the time of day, switch-on all lights for example for a cleaning service, or switch-on only the orientation lighting so that people can find their way to the workplace. With this lighting arrangement there is limited control of the lighting in a room.

It is an object of the invention to provide a system according to the opening paragraph that controls a light source in an improved way. To achieve this object, the system for controlling a light source within an area comprises location means conceived to detect a position of at least one person within an area; activity means conceived to detect a kind of activity performed by the at least one person within the area; and lighting control means conceived to control the light source within the area in response to the detected at least one person and the kind of activity performed by the at least one person within the area. By detecting the activity that a person is performing, the most suitable light source for that activity can be supplied to the person. For example, when a person is reading a book the light source should be brighter than when a person is watching a television program. The light source can also be focused upon the book in the case that the person is reading, while the light source should not be focused upon the television screen in the case that the person is watching a television program. In the latter case indirect light via for example the ceiling is more appropriate. As a further advantage, a person does not have to control the light source by explicitly operating the light switch in order to change the light settings for a specific activity.

In one embodiment of the invention, the system comprises intensity means conceived to detect an intensity with which the kind of activity is performed by the at least one person and the lighting control means is conceived to control the light source within the area in response to the detected intensity. The intensity can depend upon the kind of activity. For example, when a person is operating a personal computer and interacts with a word processing program the intensity of interaction with this word processing program is different from the intensity of interaction with for example a car-racing game. Depending upon this intensity, the lights are adjusted accordingly. For the word processing program this can result in white or yellow light with an average brightness level, while for the car-racing game, the lights can change continuously from color with a varying brightness level.

In another embodiment of the invention, the system comprises dating means conceived to determine a date and a time and the lighting control means is conceived to control the light source within the area in response to the determined date and time. The brightness level can depend upon the time of day that an activity is being performed. For example, during breakfast in the morning people prefer brighter lights while eating than during dinner in the evening.

In yet another embodiment of the invention, the system comprises noise means conceived to detect noise within the area and the lighting control means is conceived to control the light source within the area in response to the detected noise. By detecting the noise it can be detected if someone is present in a room and the lights should be switched on. Furthermore, the intensity of a conversation between two persons can be detected. For example, when two persons are talking to each other in a relaxed manner, the lighting remains at a dimmed level. However, if their conversation becomes more intense because the volume goes up, the lighting brightens.

In still another embodiment of the invention, the system comprises motion means conceived to detect motion of the person within the area and the lighting control means is conceived to control the light source within the area in response to the detected motion. In the case that the person walks around the room, the person needs more light to properly see where he or she is walking. In the case that the person sits in a chair the light source can become less bright. This way, the lights can be controlled better.

In yet another embodiment of the invention, the system comprises preference means conceived to determine a preference of a person and the lighting control means is conceived to control the light source within the area in response to the preference of the at least one person. Different persons can have different preferred lighting settings. For example, an older person can prefer a more bright light for reading than a younger person can, because the eyes of an older person are less sensitive to light. Also preferences depending upon personal taste like the color of light that is preferred can be taken into account while controlling the light.

It is an object of the invention to provide a method according to the opening paragraph that controls a light source in an improved way. To achieve this object, the method comprises detecting a position of at least one person within an area; detecting a kind of activity performed by the at least one person within the area; and controlling the light source within the area in response to the detected at least one person and the kind of activity performed by the at least one person within the area.

Embodiments of the method according to the invention include detecting a position of at least one person within an area; detecting a kind of activity performed by the at least one person within the area; and controlling the light source within the area in response to the detected at least one person and the kind of activity performed by the at least one person within the area, as well as, optionally, detecting an intensity with which the kind of activity is performed by the at least one person and the step of controlling the light source comprises controlling the light source within the area in response to the detected intensity.

It is an object of the invention to provide a lighting arrangement according to the opening paragraph that controls a light source in an improved way.

These and other aspects of the invention will be apparent from and elucidated with reference to the embodiments described hereinafter as illustrated by the following Figures.

Nowadays, light is becoming more and more important to illuminate rooms where people spend their time. The lighting conditions depend upon a number of factors like the natural light that penetrates an office, the time of the day, the environment. As an example, lighting conditions that are considered by most individuals as extremely uncomfortable in an office environment might be positively welcomed in a discotheque. Several aspects of lighting can be manipulated: the amount of light, the distribution of light, the spectrum of the light, the variation of these aspects over time, and the appearance of the luminaire.

The illuminance is the amount of light falling onto a surface. The amount of illumination required to be able to perform a task like for example reading at a comfortable level differs from what is required for a task like for example fine needlework. For example, illuminance required for optimum visibility for medium contrast paper-based tasks ranges from 500 to 1000 lux, which is considerably higher than for computer screen visibility.

Luminance is the amount of light emitted by a surface. Luminance levels in a room usually vary because of the different objects that are present within the room. A luminance ration of 10:3:1 between the task to the surrounding area to the general back ground is generally found to be comfortable.

Glare occurs when there are areas of high brightness in the visual field of a person. Direct glare is caused by light sources in the field of view, reflected glare is caused by reflections of high brightness from for example glossy surfaces. Glare can cause discomfort by reducing the ability to see fine details. Glare can be reduced by using indirect lighting.

Reflectance of walls, ceilings and other surfaces in a room, influence the distribution of light in a room.

The lighting conditions are also determined by the colors that are used. The appearance of any color is determined by the hue, saturation, and lightness. The hue is the quality by which a color is distinguished from other colors. Saturation is also referred to as strength, intensity or chroma; it designates the purity of a given color. Lightness of a color is a measure of how much light is reflected from its surface.

When designing an adaptive light system all these different aspects can be taken into account in order to create a light system that adapts the light appropriately.

Figure 1:
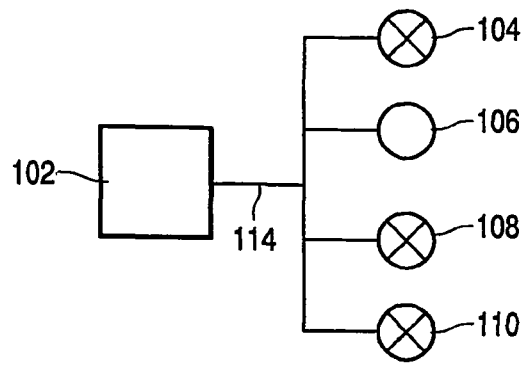
FIG. 1 illustrates an adaptive light environment according to the invention in a schematic way.

FIG. 1 illustrates an adaptive light environment according to the invention in a schematic way. A personal computer (PC) 102 is connected to light units 104, 108, and 110 and to sensor unit 106. This network of appliances is connected through Ethernet connection and the light units are controlled through a Local Operating Network (LON) controller running at the PC 102. The light units can also be controlled by using a Digital Addressable Lighting Interface (DALI) or by a proprietary micro-controller printed circuit board (PCB) that can directly control the light unit's ballast. The light unit 104 is a halogen lamp. Light unit 108 comprises two lamps: one warm light incandescent lamp and one cold light incandescent lamp. Light unit 110 comprises a Light Emitting Diode (LED) array that comprises a Red, Green and Blue LED. The halogen lamp offers functional lighting by varying the spot size and intensity through dimming. The warm and cold light provide the ambiance. In general, every color has its specific properties that can evoke specific emotions. Red and orange are generally assumed to suggest "warmth and coziness", and blue is considered to suggest "cool and cheerless" while a wild mixture of colors suggests "cheerful and festive" and purple and black are assumed to evoke a "sad and somber" atmosphere. Some other colors are assigned specific associations, like green is rest and white is sterile. Therefore, the warm light provides red and orange colors while the cold light provides blue and white colors. With the LEDs colors can be blended by optically blending the lights of the Red, Green and Blue LEDs. The sensor unit 106 comprises a motion sensor to detect movement within an area. The sensor unit 106 can also comprise a video camera that can record objects like persons, tables, and animals that are present within a room. The sensor unit 106 can further comprise a microphone through which the noise level can be recorded.

The number and kind of light units that are used merely act as an example. This holds also for the connection used for connecting all appliances with the PC.

Figure 2:
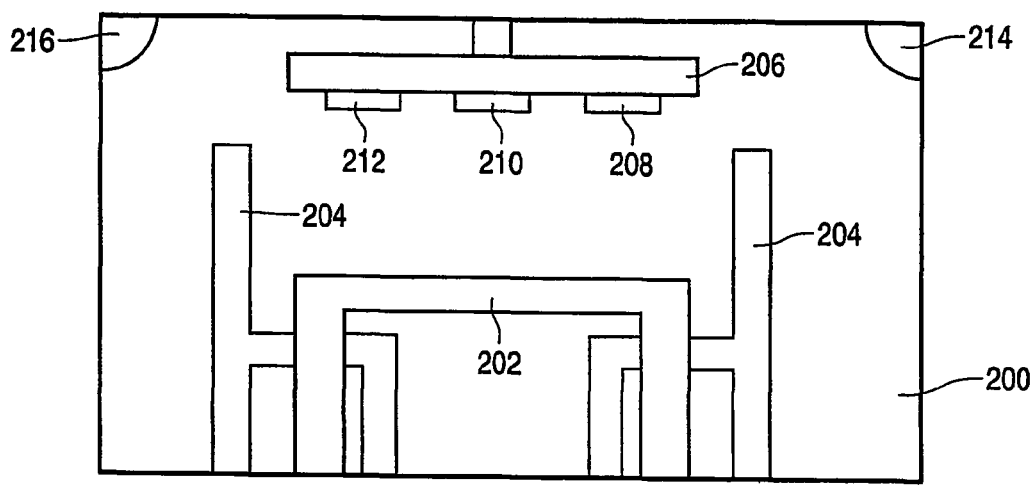
FIG. 2 illustrates a room with an adaptive light environment in a schematic way.

FIG. 2 illustrates a room with an adaptive light environment in a schematic way. The room 200 comprises a table 202, two chairs 204, a lighting arrangement 206 and three light sources 208, 210, and 212 mounted on the lighting arrangement 206. A video surveillance camera 214 is mounted in a corner of the room. In another corner, a microphone 216 is mounted to the ceiling. The lighting arrangement 206, video surveillance camera 214 and microphone 216 are connected to the LON control PC 102 as described in connection with FIG. 1. The light sources 208, 210 and 212 are halogen lamps of which the luminance level and focus can be controlled.

With these settings the following use case can be performed: Today Pete has decided to take an easy start. After a long shower he goes to the kitchen to make coffee. With the morning paper in one hand and the coffee in the other he enters the living room. Upon entering the living room, the video surveillance camera starts recording and the video images are continuously sent to the PC. On the PC a dedicated software module that is designed to analyze the video starts running to analyze the video. From this analysis the software module derives that there is movement detected in the living room. The detection software module passes this information to a light controlling module which is also running on the PC. The light controlling module is designed to control the light settings of the light sources 208, 210 and 212. Upon receipt of the message that movement is detected in the living room, the light controlling module causes each halogen light to be switched on into a moderate luminance level and with a wide focus. This way, Pete can easily walk across the room and positions himself at the long table. He drinks his coffee and folds open the morning paper. Now the detection software module derives from the analysis of the video that a person (Peter) is sitting near the table and that an object (the morning paper) lies in front of the person. This information is passed to the light controlling module. Instead of analyzing the video images, the chairs and table can also comprise pressure sensors. Then from the data received from the pressure sensors, the detection software module can derive that a person is sitting on a chair and that an object lies on the table. The light controlling module causes the halogen lamps to focus onto Pete's position and the luminance level is raised. Some moments later, Jana enters the room and positions herself at the table opposite of Pete. She starts discussing their holiday plans. The microphone 216 detects the sound of their voices. This sound is continuously sent to the PC. On the PC, another software module is running that is designed to analyze noise signals. The noise analyzing software module gives a signal to the light controlling module that there is noise detected in the room. Upon receipt of this signal, the light controlling module decreases the intensity of the halogen lamps again. Meanwhile the video analyzing module has analyzed that an other person is sitting opposite of the first person and transfers this information to the light controlling module. The information can comprise the coordinates of the two persons as absolute coordinates within the room or as relative to the halogen lights. Upon receipt of this information, the light cone is widened again to include both Pete and Jana into the light focus.

Within an other use case, Pete is working at home. He sets himself at the table with his laptop in front of him. It is being detected that a laptop is at the table using the video as previously described. This causes the lighting to be focussed at and around Pete and his laptop with a luminance level adjusted for the laptop's screen. The laptop is also connected to a home network that is again connected to the LON control PC. Pete starts using a text processing program. This information is transferred to the LON control PC. The light is adjusted to give enough light for Pete to use the text processing program. Now, Pete switches to a graphical program. Since this program requires more precise selection of the items presented on the screen, the light surrounding the screen is set brighter than in the case of the text processing program. After operating the graphical program, Pete has to contact one of his clients. He starts a videoconference program. Again this information is sent to the light controlling software module. Now, the light fades again into a warm atmosphere, to make the client feel at ease.

Figure 3:
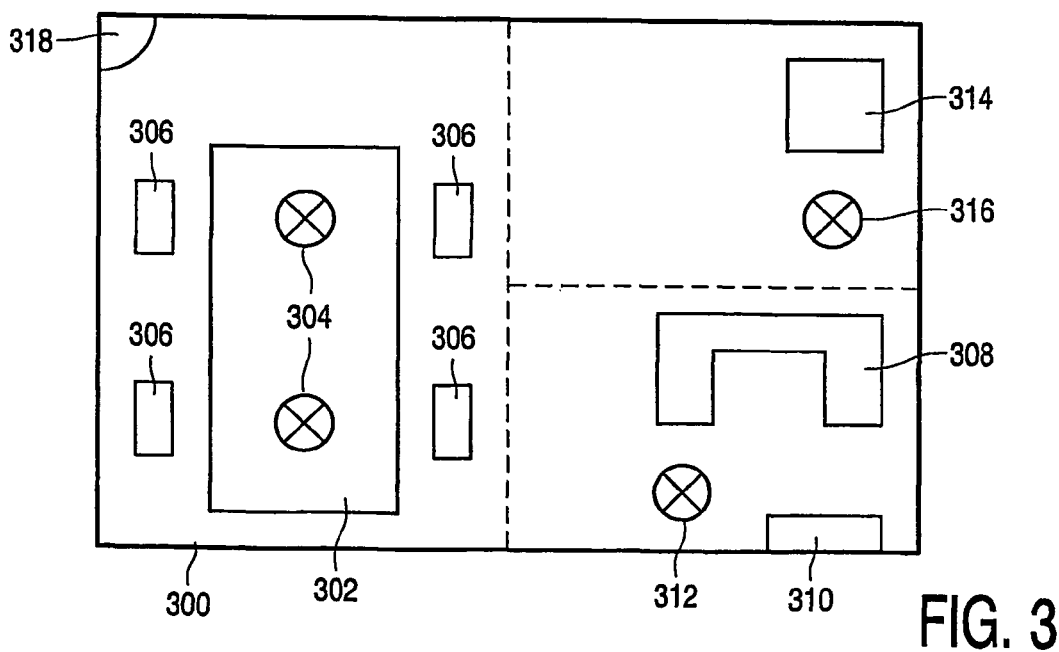
FIG. 3 illustrates a room setting with multiple light settings in a schematic way.

FIG. 3 illustrates a room setting with multiple light settings in a schematic way. The room 300, comprises a dining area I that comprises a table 302 above which two light sources 304 are mounted. Four chairs 306 surround the table 302. The room also comprises a television area III that comprises a television 310, a light source 312 and a couch 308. Further, the room 300 comprises a relaxing area II that comprises a chair 314 and a light source 316. A video camera 318 is mounted against the ceiling. The room is divided into three areas I, II and III. Within each area the light settings can be controlled separately. Within the software module that is designed to analyze the video content, the coordinates of each area are known. Now, when a person enters the room, the coordinates where the person is determines the lights that are controlled. For example, when there's only one person in the room who is sitting in chair 314, only light source 316 is switched on by the light controller software module. Depending upon the activity of the person, the light settings are adjusted. If the person is performing needle work the light is for example brighter than if the person is reading a book. In the case that there are multiple persons present that are each located into a different area of the room, more lights are controlled. For example, when one person is reading a book at the dining table 302, the lights 304 are switched on and focussed onto the person with the book. If another person is watching television 310, the light 312 next to the television 310 is switched on and directed to the ceiling to provide indirect light onto the television 310.

Figure 4:
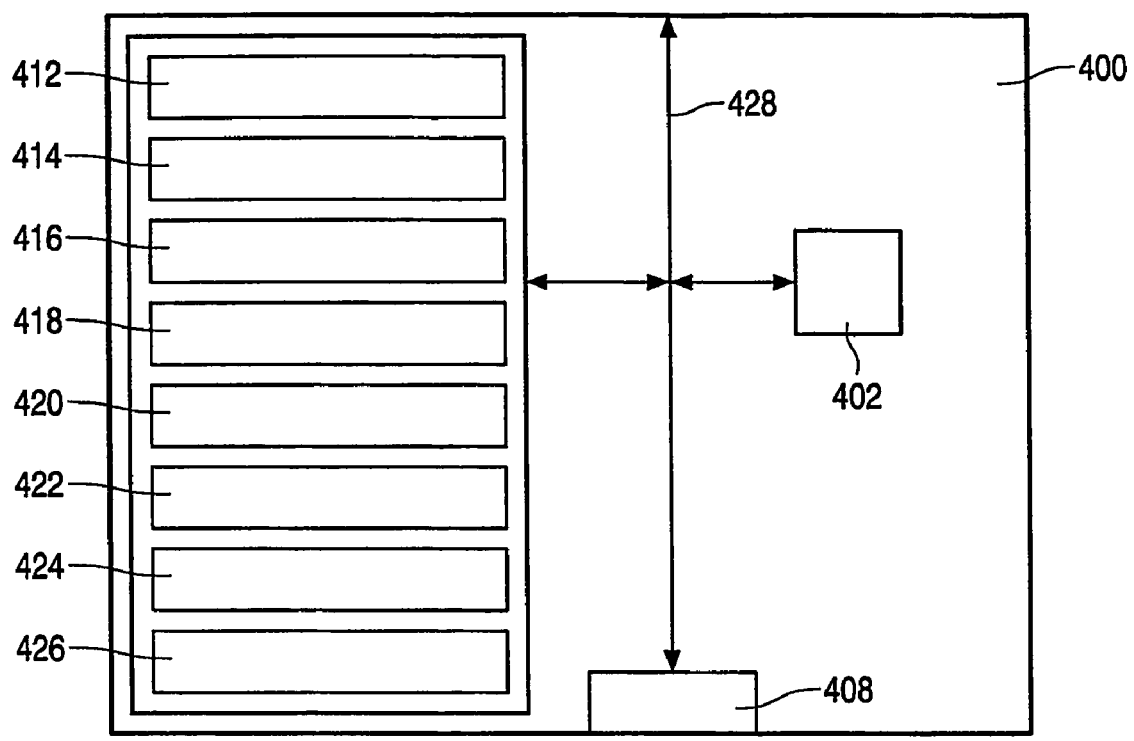
FIG. 4 illustrates a system according to the invention in a schematic way.

FIG. 4 illustrates a system according to the invention in a schematic way. The system 400 comprises a central processing unit 402, a random access memory 410, a software bus 428 and an ethernet connection 408. The ethernet connection 408 connects the system to appliances like light sources, video camera, microphone etc. The memory 410 can communicate with the central processing unit 402 via software bus 428. The memory 410 comprises computer readable code 412, 414, 416, 418, 420, 422, 424, and 426. The computer readable code 412 is designed to deduce a location of a person inside an area. The location can be deduced from video. The location can further be deduced from pressure sensors that are located within the area or by other appliances that are known in the art like a IR sensor or a proximity sensor. The computer readable code 414 is designed to deduce the activity that a person is performing within the area. The activity can be deduced from an explicit message that is being received via ethernet connection 408 from a connected appliance. For example, a PC can supply a message indicating the application that a person is using, or a coffee machine can supply a message indicating that the coffee machine is being used by the person. Other activities can for example be: reading, listening to radio, sleeping, talking on the telephone, watching a movie, talking, etc. The computer readable code 418 is designed to determine the intensity with which the activity is being performed. The intensity can for example be deduced from the number of keystrokes a person uses to provide input to a PC. The intensity can also be deduced from the noise level: the higher the noise level of a conversation, the more intense the conversation is. The computer readable code 420 is designed to determine the date and time. The date and time can influence the light settings. The light settings can depend upon the time: morning, evening and the date: weekend, weekdays, daylight saving time, etc. The computer readable code 422 is designed to detect the noise level inside the area. It can determine the amount of decibels that are being produced by the persons inside the area. The sound is provided through a microphone that is connected to the ethernet connection 408. The computer readable code 424 is designed to determine if there is motion being detected inside the room. A motion detector is therefore connected to the system 400. The computer readable code 426 is designed to comprise the preferences concerning light settings of the different persons that can enter the area. The preferences can be used in combination with the readings from computer readable code 412 and 422. Hereto, the computer readable code 412 is further designed to detect the person that is present inside the area. It can recognize, by analyzing the video images and performing face recognition, the person and/or persons that are present. Further, the computer readable code 422 is further designed to recognize the persons from their voice prints. By combining these preferences, specific preferences are taken into account like preferred light colors or luminance levels. Also, non-specific preferences can be taken into account like the age of the persons. Computer readable code 416 is designed to transfer the specific lighting settings to the lights that are connected to the system through ethernet connection 408. The responsibility of translating the readings from the connected sensors into light settings can lay with the specific computer readable code that receives the readings, or is can lay within the computer readable code 416 that transfers and directs the specific lighting settings. This is a matter of design. The system is described by means of example as a software system. However, dedicated hardware or combinations of software with hardware, like programmable hardware is also possible.

Figure 5:
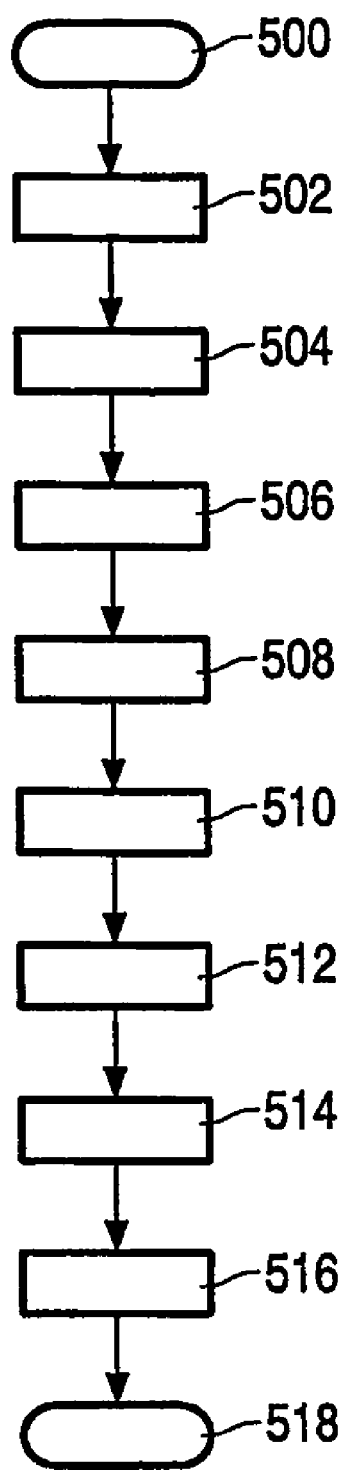
FIG. 5 illustrates a method according to the invention in a schematic way.

FIG. 5 illustrates a method according to the invention in a schematic way. Step 500 is an initialization step within which each sensor registers itself with the LON control PC. Further, the settings and capabilities of the light sources that are used are transferred to the LON control PC. Within the next step S502, the location of a person within the room is determined. For example, by determining the coordinates of the position within an area within the room. Within step S504, the activity that the person is performing is determined. Within step S506, the intensity with which this activity is being performed is determined and within step S508, the current date and time are being determined. Within the next step S510 the noise level that is being produced inside the room is being detected. It is also possible to determine the location where the noise level is highest. Within step S512, motion within the different areas within the room is being detected and within step S514, the user preferences are being taken into account such that all of this information can be translated within step S516 into the most suitable lighting settings like hue, saturation, color, direction, focus, etc. The method stops within S518. Depending upon the appliances that provide information for the different steps as previously described, steps can be omitted or the sequence of steps can be changed.

Figure 6:
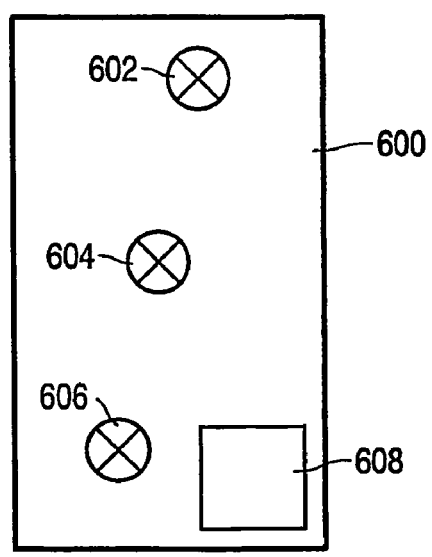
FIG. 6 illustrates a lighting arrangement according to the invention in a schematic way.

FIG. 6 illustrates a lighting arrangement comprising a system according to the invention. The lighting arrangement 600 comprises three LED lights: 602, 604, and 606 each of a different color: red, green, and blue. The lighting arrangement further comprises the system 608 according to the invention as previously described. The lighting arrangement can be connected through the ethernet connection provided by the system 608 to other lighting arrangements and also to sensors.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A system for controlling a light source within an area, the system comprising:
a location detector for detecting a position of at least one person within an area;
an activity detector for detecting a kind of activity and an intensity of the activity performed by the at least one person within the area based on a connection to an appliance, wherein the connection is configured to provide information about the kind of activity and the intensity of the activity; and
a lighting controller for controlling the light source within the area in response to the detected position of the at least one person, the kind of activity, and the intensity of the activity, wherein the activity detector is configured to detect the kind of activity and the intensity of the activity from information provided from connection to at least one of: a computer, a radio, a telephone, a kitchen appliance, a television, and a movie display device.

2. The system according to claim 1, further comprising a detector for detecting noise within the area, wherein the lighting controller is configured to control the light source within the area in response to the detected noise.

3. The system according to claim 1, further comprising a motion detector for detecting motion of the person within the area, wherein the lighting controller is configured to control the light source within the area in response to the detected motion.

4. The system according to claim 1, further comprising a preference system for determining a preference of the at least one person, wherein the lighting controller is configured to control the light source within the area in response to the preference of the at least one person.

5. The system of claim 1, wherein the activity detector is configured to detect at least one kind of activity from the following kinds of activities:
a person reading a book; and
a person watching a television program.

6. The system of claim 1, wherein the lighting controller is configured to control multiple light sources within the area in response to the detected at least one person, the kind of activity performed by the at least one person within the area, and the intensity of the activity.

7. The system of claim 1, wherein the location detector is configured to detect the position of the at least one person based upon an analysis of video images of the area.

8. The system of claim 1, wherein the activity detector is configured to detect the kind of activity performed by the at least one person based upon an analysis of video images of the area.

9. The system of claim 1,
wherein the light source comprises a first light unit;
wherein the location detector is configured to detect a position of a second person in the area, and
wherein the lighting controller is configured to control the first light unit in response to the positions of the at least one person and the second person.

10. The system of claim 1, further comprising computer-readable software code for determining the activity and the intensity thereof from the connection to the appliance.

11. The system according to claim 1, further comprising a date and time system for determining a date and a time, wherein the lighting controller is configured to control the light source within the area in response to the determined date and time.

12. The system of claim 1, wherein the location detector comprises at least one of a pressure sensor, an infrared light sensor, and a proximity sensor.

13. A method of controlling a light source within an area, the method comprising:
detecting a position of at least one person within an area;
detecting a kind of activity performed by the at least one person within the area and an intensity of the activity from information provided from a connection to at least one of the following: a computer, a radio, a telephone, a kitchen appliance, a television, and a movie display device; and
controlling the light source within the area in response to the detected at least one person, the kind of activity and the intensity of the activity.

14. The method of claim 13, further comprising:
detecting an audio signal within the area; and
controlling the light source within the area in response to the detected audio signal.

15. The method of claim 14, wherein the audio signal is a human voice.

16. The method of claim 13, further comprising:
analyzing received video images of the at least one person; and
detecting the kind of activity performed by the at least one person within the area based at least in part upon the analysis.

17. The method of claim 13, wherein the light source comprises a first light unit; and further comprising:
detecting a position of a second person within the area; and
controlling the first light unit in response to the positions of the at least one person and the second person.

18. The method of claim 13, further comprising;
determining a date and a time; and
controlling the light source within the area in response to the determined date and time.

19. A system for controlling a light source within an area, the system comprising:
a location detector for detecting a position of at least one person within an area;
an activity detector for detecting a kind of activity and an intensity of the activity performed by the at least one person within the area based on a connection to an appliance, wherein the connection is configured to provide information about the kind of activity and the intensity of the activity; and
a lighting controller for controlling the light source within the area in response to the detected position of the at least one person, the kind of activity, and the intensity of the activity, wherein the activity detector is configured to detect the kind of activity and the intensity of the activity from information provided from connection to a computer used by the at least one person.

20. A method of controlling a light source within an area, the method comprising:
detecting a position of at least one person within an area;
detecting a kind of activity performed by the at least one person within the area and an intensity of the activity from information provided from a connection to a computer used by the at least one person; and
controlling the light source within the area in response to the detected at least one person, the kind of activity and the intensity of the activity.

* * * * *